Patented Mar. 30, 1954

2,673,854

UNITED STATES PATENT OFFICE 2,673,854

PROCESS FOR PREPARING METAL PHTHALOCYANINES

Robert E. Brouillard, Westfield, N. J., assignor to General Aniline & Film Corporation, New York, N. Y., a corporation of Delaware No Drawing. Application November 14, 1950, Serial No. 195,707

10 Claims. (Cl. 260—314.5)

This invention relates to an improvement in the manufacture of metal phthalocyanines.

A procedure extensively used in the commercial production of metal phthalocyanines involves heating together a phthalocyanine-forming metal or metal-yielding compound (a "metal donor"), urea (a "nitrogen donor"), and as an organic phthalocyanine-forming intermediate, an aromatic ortho-dicarboxylic acid anhydride or related compound, in an inert high-boiling organic solvent or diluent, in the presence of a catalyst, especially a molybdate, which promotes formation of a phthalocyanine. Instead of urea, related compounds can be used as nitrogen donors, such as biuret, guanidine, guanidyl-urea, dicyandiamide, or cyanuric acid. Instead of aromatic ortho-dicarboxylic acid anhydrides, the organic phthalocyanine-forming intermediate can be the corresponding free acid, an ester, ammonium salt, mono- or diamide, imide or imido-imidine of the ortho-dicarboxylic acid, corresponding ortho-cyano-carboxylic acid or an ester, ammonium salt or amide thereof, or related ortho-substituted aromatic compounds which yield dicarboxylic acid derivatives under the conditions of the reaction, for example, the corresponding acid halides, $\omega,\omega'$-polychloro- or -polybromo-o-dimethyl aromatic compounds, or $\omega$-polychloro- or -polybromo-o-cyano-methyl aromatic compounds. Such processes are termed herein "urea solvent" processes.

As compared with processes in which no organic solvent is used, the urea solvent process is characterized by a more moderate reaction, and an improvement in the quality of the product. However, at the same time, the presence of a solvent tends to lower the yield. While acceptable yields of some phthalocyanine pigments are obtained in this process, in most cases, the yields are too low to permit satisfactory commercial operations.

For example, upon reacting phthalic anhydride and urea with aluminum chloride in the presence of an organic solvent and ammonium molybdate as a catalyst, aluminum phthalocyanine is produced in amounts corresponding to yields of the order of 10 to 15% of theory based on the amount of phthalic anhydride employed. Magnesium phthalocyanine, when prepared by a similar process using a magnesium compound instead of aluminum chloride, is likewise produced in a poor yield. This procedure is also unsatisfactory for making nickel phthalocyanine. While high yields of copper phthalocyanine are obtained in a process employing cuprous chloride in the aforesaid procedure, tetrachloro-phthalic anhydride and cuprous chloride, reacted with urea under similar conditions, fails to provide a satisfactory yield of copper hexadecachloro-phthalocyanine or a sufficiently pure product. It has been necessary, therefore, in commercial practice, to prepare copper hexadecachloro-phthalocyanine by chlorination of preformed copper phthalocyanine in a flux such as a fused mixture of aluminum chloride and sodium chloride.

It is an object of this invention to improve the yield and quality of metal phthalocyanines produced in the urea solvent process, especially in those cases in which the yield and quality of the product are otherwise unsatisfactory.

Among the specific objects of my invention is the provision of a urea solvent process for the production of magnesium phthalocyanine, aluminum phthalocyanine, nickel phthalocyanine, and copper hexadecachloro-phthalocyanine, wherein high yields are obtained and the product is of high quality.

I have discovered that these objects can be achieved by including in the reaction mixture employed in the urea solvent process for making metal phthalocyanines, a salt of sulfuric acid with an alkali metal, alkaline earth metal, ammonium or a phthalocyanine-forming metal in an amount not substantially less than 25%, and preferably up to about 100%, of the weight of the organic phthalocyanine intermediate, i. e., the aromatic ortho-dicarboxylic acid anhydride or equivalent ortho-disubstituted aromatic compound. Acid or neutral sulfates of the aforesaid metals can be used. Similar results are likewise obtained by employing, instead of the aforesaid sulfates, free sulfuric acid, its lower mono- and dialkyl esters in which the alkyl groups contain 1 to 5 carbon atoms, sulfamic acid, sulfamide and salts of the aforesaid monoalkyl sulfuric acids and sulfamic acid with the metals indicated above as suitable for the sulfates employed in accordance with the invention.

For example, I have found that inclusion of sodium, ammonium or calcium sulfate in a reaction mixture containing urea, phthalic-anhydride, aluminum chloride and a molybdate catalyst in a high-boiling organic solvent, the sulfate amounting to about half the weight of the phthalic anhydride, and heating in the usual manner to form a phthalocyanine, increases the yield of aluminum phthalocyanine from about 12% to about 85% of theory. A similar improvement in yield is obtained in like manner in the preparation of magnesium phthalocyanine and nickel phthalocyanine from phthalic anhydride as well as copper hexadecachloro-phthalocyanine from tetrachloro-phthalic anhydride in a urea solvent process.

Thus, the improved process of my invention involves heating, at phthalocyanine-forming temperatures (preferably 150 to 210° C.) a reaction mixture containing a phthalocyanine-forming metal-yielding reagent; an organic phthalocyanine intermediate of the class consisting of the aromatic ortho-dicarboxylic acids, their anhydrides, acid halides, esters, ammonium salts, dehydrated, deammoniated or dehydrated-deammoniated derivatives of such ammonium salts lacking up to a total of 3 mols of ammonia and/or of water per molecule, equivalent $\omega,\omega'$-polyhalo-o-dimethyl aromatic compounds and $\omega$-polyhalo-o-cyano-methyl aromatic compounds, in which the ortho-substituents form a tetrazaporphine ring in said reaction mixture; a nitrogen donor of the class consisting of urea, biuret, guanidine, guanidyl-urea, dicyandiamide and cyanuric acid; an inert organic liquid diluent; a catalyst, especially a molybdate catalyst; and a member of the group consisting of sulfuric acid, its amides, and its lower alcohol esters in which the alcohol radicals contain 1 to 5 carbon atoms, and sulfates, sulfamates and lower alcohol monosulfuric ester salts of alkali metals, ammonium, alkaline earth metals and phthalocyanine-forming metals, in an amount not substantially less than 25%, and preferably not substantially more than 100%, of the amount of the aforesaid organic phthalocyanine intermediate.

It has been suggested in various disclosures of the prior art to include a salt such as sodium or ammonium sulfate in a reaction mixture for the preparation of metal phthalocyanines from aromatic ortho-dinitriles in the presence or absence of an organic solvent or diluent. The purpose and effect of these salts in such reaction mixtures is to moderate the relatively violent reaction of the aromatic ortho-dinitrile by virtue of the diluting effect of the sulfate. Similarly, ammonium sulfamate has been suggested for use in phthalocyanine fusions of the urea type, including an organic phthalocyanine intermediate other than a dinitrile, and urea or similar nitrogen donor, but in the absence of an organic solvent or diluent. The sulfamate in such a process serves as a flux, facilitating the reaction. In the present process, the sulfuric acid compounds exert their beneficial effect regardless whether they dissolve or not in the reaction mixture, and the increased yields and improved quality cannot be explained by any analogy with previously known processes not employing an organic solvent, or starting with ortho-aromatic dinitriles.

The aromatic ortho-disubstituted compounds serving as organic phthalocyanine intermediates for the process of my invention are preferably phthalic anhydride and its nuclear substitution products. Suitable nuclear substituents are, for example, halogen (e. g. chlorine or bromine), nitro, alkyl, aryl, condensed nuclear aryl, alkoxy, aryloxy, alkyl thio, aryl thio, and alkyl or aryl keto groups (i. e., acyl groups). Instead of the anhydride, the corresponding ortho-dicarboxylic acid can be used or an ester or acid halide thereof, a salt (especially an ammonium salt) thereof, mono- or diamides, imides, as well as the corresponding ortho-cyanocarboxy acid, its esters, ammonium salt or amide. In similar manner, corresponding $\omega,\omega'$-polyhalo-o-dimethyl aromatic compounds and $\omega$-polyhalo-o-cyano-methyl aromatic compounds can be used.

Suitable nitrogen donors are those enumerated above.

Catalysts employed in the reaction mixture are of the type disclosed in U. S. P. 2,214,477, such compounds generally containing an element of group V or VI of the periodic table, having an atomic number from 15 to 92, inclusive, especially molybdates such as alkali metal or ammonium molybdates, phospho-molybdates or tungsto-molybdates. Suitable amounts of such catalysts range from 0.1 to 2% of the weight of the total reaction mixture.

Metal-yielding compounds or "donors" suitable for use in the reaction mixture are those containing metals heretofore employed for forming metal - phthalocyanines — namely, polyvalent metals and their salts such as copper, aluminum, magnesium, nickel, iron, cobalt, zinc, vanadium, and the like. Compounds of these metals adapted for use as metal donors include the halides (chlorides or bromides), sulfates, nitrates and oxides.

When a sulfate, sulfamate or alcohol sulfuric ester salt, employed in accordance with this invention to promote the reaction, is the salt of a phthalocyanine-forming metal, the latter is preferably a metal of the phthalocyanine to be formed, e. g. it is preferably the same as the metal of the metal donor if another metal donor is used. However, it can also be a salt of a phthalocyanine-forming metal which is displaced in the phthalocyanine molecule by the metal of the metal donor. Thus, magnesium is displaced in the phthalocyanine molecule by other metals such as copper, aluminum or nickel, as well as by acid treatment, whereas the latter metals are not displaceable by other metals and the pigments are stable toward acids. When the sulfate, sulfamate or sulfuric ester salt of a phthalocyanine-forming metal is employed not only as a promoting agent in accordance with this invention, but also entirely or in part as the metal donor, the metal content thereof required to form the phthalocyanine is excluded or subtracted from the amount of said salt in calculating the amount acting as a promoter, the amount thus calculated being not substantially less than 25% of the weight of the organic phthalocyanine intermediate for the purposes of this invention.

Solvents suitable for the reaction are inert organic solvents having a sufficiently high boiling point to remain liquid under the conditions of the reaction. They include, for example, trichlorobenzene, chlorobenzene, naphthalene and its chlorinated derivatives, quinoline, benzophenone, nitrobenzene, and the like.

Processes according to my invention are illustrated by the following examples, wherein parts are by weight.

*Example 1*

10 5 parts of phthalic anhydride, 12.5 parts of urea, 0.25 part of ammonium molybdate, and 5.4 parts of anhydrous sodium sulfate are slurried in 35 parts of trichlorobenzene. A slurry of 3 parts of anhydrous aluminum chloride in 5 parts of trichlorobenzene are added, and the mixture is agitated and heated gradually under reflux to 200 to 205° C. over a period of 6 hours. A slurry of 5.4 parts of urea in 10 parts of trichlorobenzene are then added, and the temperature maintained at 200 to 205° C. for 5 hours. Chloroaluminum phthalocyanine produced in the resulting reaction is recovered by filtration of the reaction mixture after cooling, the filter cake being washed with trichlorobenzene and dried. A yield of 85% of theory of chloroaluminum phthalocyanine is obtained in substantially pure form.

Similar results are obtained by substituting an equal amount of calcium or magnesium sulfate for the sodium sulfate of this example. When magnesium sulfate is used, chloroaluminum phthalocyanine is formed despite the fact that magnesium is also a phthalocyanine-forming metal, magnesium being replaceable by hydrogen and by acid-stable phthalocyanine-forming metals, while aluminum forms an acid-stable phthalocyanine and is not replaceable by hydrogen or other metals. Moreover, an equal amount of aluminum sulfate can be substituted for the sodium sulfate.

*Example 2*

116.2 parts of phthalamide, 126 parts of urea, 30 parts of aluminum chloride, 2.5 parts of ammonium molybdate and 54 parts of sodium sulfate are slurried in 400 parts of tetrachlorobenzene, and the mixture heated at 200 to 205° C. for 1 hour. A slurry of 54 parts of urea in 100 parts of trichlorobenzene is added to the mixture and the latter agitated at 200 to 205° C. for 5 additional hours. The mixture is filtered, the filter cake washed with trichlorobenzene, and dried. Chloroaluminum phthalocyanine is formed in a yield of the same order as in the first example, and can be purified by extraction with aqueous caustic soda.

Instead of phthalamide, 104.2 parts of phthalimide or 103.7 parts of o-cyanobenzamide can be used to obtain similar results.

*Example 3*

20 parts of tetrachloro-phthalic anhydride, 13 parts of urea, 0.25 part of ammonium molybdate, 3 parts of cuprous chloride and 5 parts of sodium sulfate are slurried in 50 parts of trichlorobenzene, and the mixture heated at 200 to 205° C. for 5 hours. On filtering the mixture, washing the filter cake with trichlorobenzene, evaporating the solvent from the pigment, drying and extracting with water, a good yield of a brilliant green copper hexadecachloro-phthalocyanine is obtained.

Similar results are produced upon substituting for the sodium sulfate of this example, a similar amount of ammonium sulfate or calcium sulfate. The latter can be removed from the pigment by extraction with aqueous ammonium salts, e. g. ammonium acetate.

*Example 4*

10.5 parts of phthalic anhydride, 12.6 parts of urea, 2.96 parts of anhydrous nickel chloride, 0.25 part of ammonium molybdate and 5.4 parts of anhydrous sodium sulfate are slurried with 40 parts of trichlorobenzene and the mixture heated at 200° C. for 1 hour. 5.4 parts of urea in the form of a slurry in 10 parts of trichlorobenzene are then added to the mixture, and the latter heated at 200° C. for 4 hours. The mixture is then filtered and dried, slurried with hot aqueous alkali, filtered and washed with water, whereby nickel phthalocyanine in good yield and high quality is obtained.

Similar results are obtained by employing an equal amount of ammonium sulfate instead of the sodium sulfate of this example.

*Example 5*

10.5 parts of phthalic anhydride, 12.6 parts of urea, 0.91 part of magnesium oxide, 0.25 part of ammonium molybdate and 5.4 parts of sodium sulfate are slurried with 40 parts of trichlorobenzene and the mixture heated with agitation at 200° C. for 4 hours. The reaction mixture is then filtered, the trichlorobenzene removed by evaporation from the filter cake, and the latter slurried with hot aqueous alkali. The slurry is filtered hot, and the filter cake washed with water until neutral, whereby a high yield of bright blue magnesium phthalocyanine is obtained.

The same product is obtained in this example by substituting for the sodium sulfate a similar amount of ammonium sulfate or magnesium sulfate. When magnesium sulfate is used, the magnesium oxide can be omitted, and the amount of magnesium sulfate increased by an amount equal to the magnesium contained in the magnesium oxide (i. e., by 0.55 part) to 5.95 parts of magnesium sulfate.

*Example 6*

A mixture of 10.5 parts of phthalic anhydride, 12.6 parts of urea, 0.25 part of ammonium molybdate, 3 parts of aluminum chloride and 5 parts of sulfuric acid are slurried in 40 parts of trichlorobenzene and the mixture heated at 200 to 205° C. for 5 hours. A bluish-green precipitate is recovered by filtration, and washed with trichlorobenzene. The solvent is evaporated, the residue washed with water until neutral, and then dried. A good yield of chloroaluminum phthalocyanine is thus obtained.

*Example 7*

A mixture of 10.5 parts of phthalic anhydride, 12.5 parts of urea, 0.25 part of ammonium molybdate and 5.4 parts of sodium sulfamate are slurried in 35 parts of trichlorobenzene. A slurry of 3 parts of anhydrous aluminum chloride in 5 parts of trichlorobenzene are added, and the mixture is agitated and heated gradually under reflux to 200 to 205° C. for a period of 6 hours. A slurry of 5.4 parts of urea in 10 parts of trichlorobenzene are then added, and the temperature maintained at 200 to 205° C. for 5 hours. The reaction mixture is cooled, filtered, and the filter cake of chloroaluminum phthalocyanine is washed with trichlorobenzene and dried. A high yield of chloroaluminum phthalocyanine is obtained in a high state of purity.

Similar results are obtained by substituting for the sodium sulfamate employed in this example, a similar amount of sulfamide or free sulfuric acid.

*Example 8*

10.5 parts of phthalic anhydride, 12.5 parts of urea, 0.25 part of ammonium molybdate and 5.4 parts of diethyl sulfate are slurried in 35 parts of trichlorobenzene. 3 parts of anhydrous aluminum chloride suspended in 5 parts of trichlorobenzene are added and the mixture is heated with agitation to 200 to 205° C. over a period of 6 hours. 5.4 parts of urea in the form of a slurry in 10 parts of trichlorobenzene are added, and the temperature maintained at 200 to 205° C. for 5 hours. Chloroaluminum phthalocyanine is recovered from the resulting mixture by filtration, the filter cake being washed with trichlorobenzene and dried. Chloroaluminum phthalocyanine is thus obtained in high yield and in substantially pure form.

Similar results are obtained by substituting for diethyl sulfate an equal amount of sodium, calcium or ammonium salt of ethyl sulfuric acid.

In the foregoing examples, neutral as well as acid sulfates of the alkali metals (Na or K), of ammonium (NH4) and of alkaline earth metals (Ca, Ba, Sr, Mg), can be substituted for the salts employed as promoters for the reaction. Similarly, the sulfates of phthalocyanine-forming metals such as copper, aluminum, iron, cobalt, zinc, tin and magnesium can be used instead, particularly in preparing phthalocyanines of the metal contained in said salt, the promoting sulfate being supplemented by another metal donor of the same metal, or the amount of sulfate being increased by the amount of metal theoretically required to form the metal phthalocyanine. Instead of the sulfates, the corresponding sulfamates or lower alcohol sulfuric ester salts (in which the alcohol radical contains not more than 5 carbon atoms) of the aforesaid metals can be used; or sulfuric acid, sulfamic acid, sulfamide, or acid or neutral lower alcohol esters of sulfuric acid can be used in which the esterifying alcohol radical contains not more than 5 carbon atoms.

Instead of urea, there can be used biuret, guanidine, guanidyl-urea, dicyandiamide or cyanuric acid. Ammonium molybdate can be replaced by alkali metal molybdates, phosphomolybdates or tungsto-molybdates. Other compounds having similar catalytic action can be similarly used.

Convenient metal donors are those disclosed in the examples. Metallic copper or other copper salts can be used instead of cuprous chloride; aluminum acetate can replace aluminum chloride; magnesium nitrate or chloride can replace magnesium oxide, and nickel nitrate can replace nickel chloride. Salts of cobalt, metallic zinc or its salts, iron or iron salts can be substituted for the metal compounds of the examples to prepare the corresponding metal phthalocyanines.

Instead of the o-dicarboxy anhydrides or amides of the examples, there can be employed as aromatic ortho - substituted phthalocyanine-forming intermediates, the corresponding free acids, the ammonium salts and esters, mono- or diamide or imide, esters or ammonium salt of the corresponding monoamide, as well as the corresponding o-cyanobenzoic acid, its ammonium salt, ester or amide. Other suitable intermediates are the corresponding o-di-carboxylic acid chlorides, e. g. phthalyl chloride, and compounds which react in similar manner under the reaction conditions, for example, $\omega,\omega'$-polychloro- or -polybromo-o-dimethyl aromatic compounds (e. g. $\omega$-tetra-, -penta-, or -hexachloro-o-xylene); or $\omega$-chloro- or -bromo-o-methyl aromatic nitriles (e. g. $\omega$-mono-, -di- or -tri-o-tolunitrile).

The aforesaid aromatic intermediates are preferably of the benzene series and can contain additional nuclear substituents which are non-reactive under the reaction conditions, e. g. chlorine, bromine, nitro, alkoxy, aryloxy, alkyl-thio or aryl-thio radicals, alkyl or aryl hydrocarbon radicals.

Trichlorobenzene, employed as a diluent in the examples, can be replaced by other inert organic solvents such as nitrobenzene, dichlorobenzene, benzophenone, naphthalene, chlorinated naphthalenes, quinoline and the like, which have a sufficiently high boiling point to permit operation in the liquid phase at reaction temperature. If desired, superatmospheric pressure can be used to maintain the solvent in liquid form during the reaction.

Suitable amounts of the sulfuric acid compounds employed as promoters in accordance with this invention are at least 25% of the weight of the aromatic phthalocyanine-forming intermediate (e. g. of the amount of phthalic anhydride). Amounts substantially exceeding the weight of the phthalocyanine-forming intermediate produce no substantial improvement in yield or quality and are preferably not employed. The proportions in the examples wherein the amount is approximately one-half to two-thirds the amount of the organic intermediate are generally preferred.

Suitable proportions for the remaining ingredients of the reaction mixture are illustrated in the examples. Thus, the amount of trichlorobenzene may be about 4 to 5 times the amount of aromatic phthalocyanine-forming intermediate. An equivalent amount of other inert solvents can be used instead. The amount of urea is preferably 2½ to 5 mols per mol of the aromatic phthalocyanine-forming intermediate. The proportion of metal-yielding compound is somewhat in excess (e. g. an excess of 10 to 30%) of the amount theoretically required to form a metal phthalocyanine with the intermediate employed. Thus, in the examples, at least 0.28 to 0.32 mol of metal compound (containing one atom of metal) is employed per molecule of phthalic anhydride or derivative thereof, the amount of metal compound theoretically required being 0.25 mol per mol of the phthalic anhydride. When the sulfuric acid compound employed as a promoter is the salt of a metal which forms the phthalocyanine to be prepared, the quantity of other metal donor reagents can be correspondingly increased to maintain a sufficient quantity of available metal within the foregoing limits, and to maintain the amount of the sulfuric acid compound promoter within the limits specified therefor, exclusive of the metal required for phthalocyanine formation. Ammonium molybdate, or similar catalysts, are advantageously employed in an amount corresponding to 0.1 to 0.5% of the weight of the total reaction mixture. Amounts up to 2% can be used but are, in general, not required.

The reaction temperature can be varied over a considerable range, depending upon the specific reagents employed. Suitable temperatures generally lie within the range of 150 to 210° C. Satisfactory results can be obtained in most cases by maintaining a temperature of about 200° C. for 4 to 5 hours.

The pigments produced can be readily isolated from the reaction mixture by filtration, removal of the organic solvent, and extraction with aqueous alkali.

Variations and modifications which will be obvious to those skilled in the art can be made in the procedures hereinbefore described, without departing from the scope or spirit of this invention.

I claim:

1. In a process for preparing a metal phthalocyanine, which comprises heating, at phthalocyanine-forming temperature, a reaction mixture containing an organic phthalocyanine intermediate of the class consisting of carbocyclic aromatic ortho-dicarboxylic acids, their anhydrides, acid halides, esters, ammonium salts, mono- and diamides, imides and iminoimidines, the corresponding ortho-cyanocarboxylic acids and their esters, amides and ammonium salts, and corresponding ω,ω'-polyhalo-o-dimethyl and ω-polyhalo-o-cyanomethyl aromatic compounds; a nitrogen donor of the class consisting of urea, biuret, guanidine, guanidyl-urea, dicyandiamide and cyanuric acid, and a phthalocyanine-forming metal donor reagent, in the presence of a catalyst promoting phthalocyanine formation in an inert organic liquid diluent, the improvement which comprises including in said reaction mixture an amount not substantially less than 25% of the weight of the said organic phthalocyanine intermediate, of a sulfuric acid compound of the group consisting of sulfuric acid, sulfamic acid, sulfuric acid monoesters of alcohols of 1 to 5 carbon atoms, salts of ammonium, alkali metals, alkaline earth metals, ammonium and phthalocyanine-forming metals of the aforesaid acids and monoesters, sulfamide, and neutral sulfuric esters of alcohols of 1 to 5 carbon atoms.

2. In a process for preparing a metal phthalocyanine, which comprises heating, at a temperature of 150 to 210° C., a reaction mixture containing an organic phthalocyanine intermediate of the class consisting of carbocyclic aromatic ortho-dicarboxylic acids, their anhydrides, acid halides, esters, ammonium salts, mono- and diamides, imides and iminoimidines, the corresponding ortho-cyanocarboxylic acids and their esters, amides and ammonium salts, and corresponding ω,ω'-polyhalo-o-dimethyl and ω-polyhalo-o-cyanomethyl aromatic compounds; a nitrogen donor of the class consisting of urea, biuret, guanidine, guanidyl-urea, dicyandiamide and cyanuric acid, and a phthalocyanine-forming metal donor reagent, in the presence of a molybdate catalyst in an inert organic liquid diluent, the improvement which comprises including in said reaction mixture an amount not substantially less than 25%, and not substantially exceeding 100%, of the weight of the said organic phthalocyanine intermediate, of a sulfuric acid compound of the group consisting of sulfuric acid, sulfamic acid, sulfuric acid monoesters of alcohols of 1 to 5 carbon atoms, salts of alkali metals, alkaline earth metals, and other phthalocyanine-forming metals of the aforesaid acids and monoesters, sulfamide, and neutral sulfuric esters of alcohols of 1 to 5 carbon atoms.

3. A process as defined in claim 2, wherein said metal-yielding reagent is an aluminum salt.

4. A process as defined in claim 2, wherein said metal-yielding reagent is a nickel salt.

5. A process as defined in claim 2, wherein said metal-yielding reagent is a magnesium compound.

6. A process as defined in claim 2, wherein said organic phthalocyanine intermediate is tetrachloro-phthalic anhydride and said metal-yielding reagent is a copper salt.

7. A process for preparing chloroaluminum phthalocyanine, which comprises heating, at a temperature of about 200° C., a reaction mixture containing aluminum chloride, phthalic anhydride, urea, and a molybdate catalyst in an inert organic diluent together with an alkali metal sulfate amounting to 25 to 100% of the weight of phthalic anhydride.

8. A process for preparing nickel phthalocyanine, which comprises heating, at a temperature of about 200° C., a reaction mixture containing nickel chloride, phthalic anhydride, urea, and a molybdate catalyst in an inert organic diluent together with an alkali metal sulfate amounting to 25 to 100% of the weight of phthalic anhydride.

9. A process for preparing magnesium phthalocyanine, which comprises heating, at a temperature of about 200° C., a reaction mixture containing magnesium oxide, phthalic anhydride, urea, and a molybdate catalyst in an inert organic diluent together with an alkali metal sulfate amounting to 25 to 100% of the weight of phthalic anhydride.

10. A process for preparing copper hexadecachlorophthalocyanine, which comprises heating, at a temperature of about 200° C., a reaction mixture containing cuprous chloride, tetrachloro-phthalic anhydride, urea, and a molybdate catalyst in an inert organic diluent, together with an alkali metal salt amounting to 25 to 100% of the weight of said tetrachlorophthalic anhydride.

ROBERT E. BROUILLARD.

References Cited in the file of this patent

UNITED STATES PATENTS

| Number | Name | Date |
|---|---|---|
| 2,166,213 | Heilbron | July 18, 1939 |
| 2,197,458 | Wyler | Apr. 16, 1940 |
| 2,216,867 | Wyler | Oct. 8, 1940 |
| 2,469,663 | Moser | May 10, 1949 |